United States Patent Office 3,244,484
Patented Apr. 5, 1966

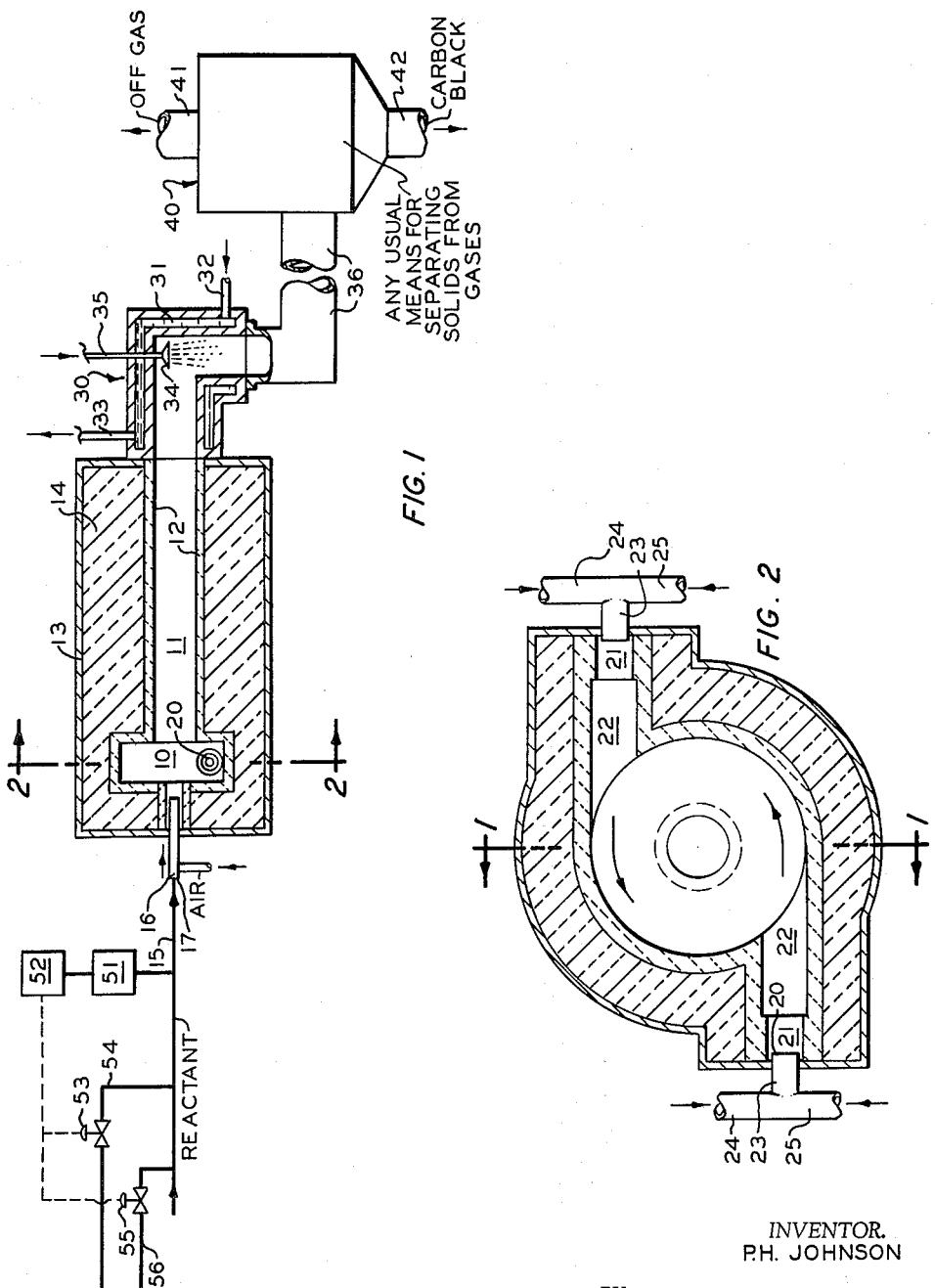

3,244,484
PRODUCTION OF CARBON BLACK
Paul H. Johnson, Bartlesville, Okla., assignor to Phillips
Petroleum Company, a corporation of Delaware
Filed May 28, 1962, Ser. No. 198,270
15 Claims. (Cl. 23—209.4)

This invention relates to the production of carbon black. In one aspect it relates to the production of high structure carbon black from feedstocks containing an alkali metal. In another aspect the invention relates to controlling the structure of carbon black. In another aspect the invention relates to relatively high structure carbon black made from a hydrocarbon feedstock containing an alkali metal.

By "structure" of a carbon black is meant characteristics which relate to flocculation of the carbon black particles. The structure is said to be high when there is a strong tendency for the particles to form chains of particles. Conversely the structure is said to be low when there is little tendency to form such chains.

"High structure" carbon black is generally considered to be one having an oil absorption of about 1.35 to 1.45 and this is the usual range for oil furnace blacks. "Normal structure" is considered to be about 0.75 to 1.2 and has generally been made by the channel black process. "Low structure" is considered to be about 0.45 to 0.55 and is made by the thermal process. Recently, however, furnace blacks having relatively low structure for blacks of this type have been marketed. These blacks have, in some instances, proved to be useful in applications formerly served by channel blacks, for example, in reinforcing natural rubber products and in specific applications, for example, in non-squeal soft-riding tires. These blacks often are designated "low structure" blacks because they are lower than normal for blacks made by the furnace process even though their oil absorption values fall in the upper portion of the range of the blacks generally designated as "normal" structure or in the range between "normal" and "high" structure. All of the above figures for oil absorption are for unpelleted black. Working tends to reduce this value and pelleted blacks have values approximately 0.1 lower in all ranges.

One of the factor which affects the structure of carbon black is the content of alkali metal in the feedstock. Feedstocks containing at least 1.5 parts by weight of an alkali metal to a million parts by weight of hydrocarbon feedstock have a relatively low structure as compared to carbon blacks normally produced from most other feedstocks by furnace process. Of the alkali metals, potassium is known to have a marked effect upon the structure produced from feedstocks containing it. However, high structure blacks are still preferred in many applications. Where potassium has been added to feedstocks for the production of relatively low structure black or where feedstocks naturally contain an alkali metal such as potassium and particularly where feedstocks contain varying amounts of an alkali metal such as potassium, a problem arises if it is desired to produce a relatively high structure carbon black, especially a constant value relatively high structure, when the feedstock has sufficient alkali metal to reduce the structure below the desired amount or has a varying alkali metal content such that structure varies undesirably. I have found that the structure reducing effect of alkali metal in the production of carbon black is at least partially countered by sulfur present in the reaction zone. Where the alkali metal containing feedstock contain varying amounts of sulfur there are corresponding variations in structure.

An object of my invention is to produce relatively high structure furnace carbon black.

Another object of this invention is to control the structure of carbon black produced from a variable feed.

Another object of my invention is to produce an improved carbon black.

Another object of my invention is to compensate variations in hydrocarbon raw materials which otherwise would significantly affect the quality of the produced carbon black.

Another object of my invention is to compensate variations in alkali metal contact of hydracarbon raw materials used in the production of carbon black.

Another object of my invention is to compensate variations in sulfur content of hydrocarbon carbon black feedstocks containing alkali metal.

Other aspects, objects and advantages of my invention are apparent in the written description, the drawing and in the claims.

According to my invention the structure of carbon black produced by thermal decomposition or dissociation of the fluid hydrocarbon feedstock is controlled by continuously introducing at a controlled rate into the reaction zone a substance comprising sulfur in amounts sufficient to provide at least 0.3 part by weight of sulfur per 100 parts by weight of the hydrocarbon reactant.

Further according to my invention there is provided an improved, relatively high structure furnace carbon black produced by decomposing a hydrocarbon reactant containing an alkali metal, especially potassium, to form carbon black in the presence of a sulfur-containing compound.

I have discovered that the sulfur present in the carbon black reaction zone is a critical factor when the carbon black is made from a feedstock comprising an alkali metal. My invention is particularly applicable to a hydrocarbon feedstock containing at least 1.5 parts of potassium per million parts by weight of the feedstock used to produce the carbon black. The potassium present in the hydrocarbon feedstock can be either a connate material, that is a potassium material or compound naturally occurring in the feedstock, or a potassium-containing material of compound which has been added to the feedstock. The potassium material or compound can be present in an inorganic form, for example the chloride, the sulfide, the carbonate, the nitrate, the hydroxide, etc., or in an organic form such as metallo-organic compounds, sulfoorganic acids, including fatty acids, potassium alkyls, etc.

The most useful and most convenient control additives of my invention are the oil-soluble sulfur compounds such as the alkyl sulfides and polysulfides. Some examples are carbon disulfide, hydrogen sulfide, mercaptans such as ethyl mercaptan, tertiary butyl mercaptan, n-heptyl mercaptan, myricyl mercaptan, phenyl mercaptan, and orthoxylene dimercaptan, thioethers (alkyl sulfides) such as ethyl sulfide, propyl sulfide, butyl sulfide, methyl ethyl sulfide, methyl isopropyl sulfide, thiophenes such as thiophene, 2-methylthiophene, 2,3-dimethylthiophene, 2-ethylthiophene, thiophanes such as hexylthiophane, octylthiophane, isooctylthiophane, n-decylthiophane, octadecylthiophane, organic disulfides such as ethyl disulfide, butyl disulfide, methyl isobutyl disulfide and polysulfides such as the polymers produced by the chemical reaction between dichlorodiethylformyl and an alkali polysulfide.

It is possible to employ insoluble sulfur-containing materials and even sulfur itself by suitably charging these in the feedstock, preferably just prior to injection into the reactor. The effective element of the additive is sulfur and the concentration can therefore be calculated on the basis of the sulfur present. A sulfur concentration in the range of 0.3 to 1.5 parts by weight per 100 parts by weight of the feedstock will appreciably raise the oil absorption values of carbon black made in the presence of alkali metals. Preferably the sulfur content is in the range of 0.5 to 1 part per 100 parts by weight of the hydrocarbon feedstock.

Since the properties of carbon black and the properties of compounded rubber which it influences must be kept within an extremely narrow range to be acceptable, it is difficult to control these properties adequately because of the nature of the manufacturing process and variables in the constitution of the feedstock hydrocarbon materials employed. In general, the industry cannot afford extensive and expensive purification treatment for these feedstocks; very often the feedstock is a byproduct stream from some other process. As a result, these feedstocks cannot be maintained uniform, and very often contain relatively high concentrations of impurities which adversely effect the properties of the product carbon black. For example, certain crude oils, such as from Monagas, Venezuela, contain sufficient concentration of alkali metals to lower the structure of the carbon black. In other instances alkali metals have been introduced into feedstocks intentionally or accidentally in concentrations greater than desired and changes in structure have overshot the mark.

I have discovered that the effect of alkali metals present in the carbon black reaction in lowering the oil adsorption (structure) of the product can be counteracted to a significant degree if sulfur compounds are present in the reactions zone, for example by being added to the oil feedstock, or otherwise introduced into the reaction zone prior to the formation of the carbon black. This provides an important method of controlling and adjusting the final properties of the carbon black. If both alkali metal and sulfur are added in controlled and variable amounts, a control system of great flexibility results.

My invention is particularly applicable to the furnace process for manufacturing carbon black. Apparatus and a method of manufacture suitable for use in the practice of my invention are described in Krejci, U.S. 2,564,700.

In the drawing, FIGURE 1 is a vertical elevation of a carbon black furnace. FIGURE 2 is a section along the line 2—2 of FIGURE 1.

The drawing is diagrammatic and such parts of the apparatus as feed lines, air pipes, combustible gas pipes, pumps, valves, meters, pressure regulators, pressure-measuring devices, temperature-measuring devices, and other conventional apparatus are shown schematically or have been eliminated from the drawing to avoid unnecessary complication.

A first short cylindrical chamber 10, having a relatively large diameter, is axiallly aligned with a smaller diameter relatively long chamber 11, and chambers 10 and 11 have a lining 12 of highly refractory material such as sillimanite, alumina or other refractory material suitable for the temperatures and materials encountered. Between the refractory liner 12 and the cylindrical steel shell 13 is a layer of insulation 14.

In the upstream or inlet end wall of chamber 10 is a feed pipe 15 arranged axially so that feed introduced therethrough passes axially through the furnace. Surrounding feed pipe 15 is a larger pipe 16, thus defining an annular space 17 through which air or other gas can pass into the furnace. The purpose of the gas passing through space 17 is to keep the inner end of feed tube 15 cooled to prevent the deposition of carbon thereon.

Around chamber 10 there are arranged inlets 20 which are exposed so that gas passing therethrough into chamber 10 does so in a direction tangent to the cylindrical wall of chamber 10. Each tangential inlet 20 comprises a combustion chamber 21 and a conduit 22 which latter terminates as an opening in the refractory liner 12 of chamber 10. A pipe 23 extends part way into combustion chamber 21 as shown. Separate conduits 24 and 25 are provided for feeding fuel and an oxygen-containing gas, respectively, to pipe 23.

At the outlet end of the furnace is a cooler assembly 30 and a carbon black separating or recovery means 40.

Cooler assembly 30 includes a water jacket 31 having inlet and outlet pipes 32 and 33, respectively, a spray nozzle 34 and a water supply pipe 35 therefor. A conduit 36 connects cooler assembly 30 with carbon black separating means 40. Off gas is taken from means 40 through pipe 41 while carbon black is removed through pipe 42.

Suitable control means for regulating the supply of sulfur in the reaction zone include analyzer 51, controller 52, control valve 53 on sulfur compound inlet 54 and control valve 55 on low sulfur feedstock inlet 56. In operation, a suitable fuel is fed through the pipes 25, mixes with a free oxygen-containing gas supplied to pipes 24 and a combustible mixture is fed through pipes 23 into combustion chamber 21 where combustion takes place. The hot products of combustion then flow through the conduits 22 and enter chamber 10 tangentially. Although 21 is designated as a combustion chamber, in many instances a substantial amount of combustion also takes place in conduit 22 and some can occur in chamber 10. The reactant enters through pipe 15 axially into chamber 10 and thence axially into chamber 11. Heat is transferred from the rotating hot gases to the axially fed reactant, thus converting or decomposing the reactant hydrocarbon to carbon black, the heat being transferred by mixing at the interface between the hydrocarbon and the combustion gases, or by radiation or by both. Upon issuing from the reactor the gaseous effluent carrying the carbon black is cooled. The carbon black is separated therefrom by any usual means, such as by running the effluent through bags to screen out the carbon black through an electrical precipitator or cyclone separators, etc. The amount of sulfur introduced into the reactor is controlled by continuously analyzing the feedstock for sulfur by analyzer 51 and controlling the addition of the sulfur compound by controlling the addition of sulfur compound through control valve 53 and the addition of a low sulfur feedstock through control valve 55, by means of controller 52.

As pointed out above, by structure as herein applied, is meant the surface characteristics of the carbon black particles whereby these particles have a tendency to link together to form chains of particles. Where the tendency is strong to form particle chains, the black is said to have high structure, wheras when there is little tendency to form such chains the black is said to have low structure. Since it is not convenient to measure the structure directly, the oil absorption of the black which has been found to correlate closely often is used as a "measure" of the structure.

Oil absorption is measured by adding oil a few drops at a time to a 1-gram sample of carbon black on a mixing stone or glass plate. After each addition, the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black or converted to gallons of oil per 100 pounds of black.

Although oil absorption correlates closely with structure, it is also affected by particle size. Particle size is a function of the total volumetric throughput which is determined to a large extent by the amount of tangential gas supplied. Further, in the production of the carbon black the temperature and the time of treatment are controlled to obtain a maximum of conversion with a minimum of aftertreating. Since the time of treatment is determined by consideration of particle size, the conversion is controlled by temperature. This is regulated by regulating the amount of reactant introduced, too large an amount resulting in lower than desired conversion, while too small an amount results in aftertreatment.

By my invention the structure of the carbon black produced is regulated by regulating the amount of sulfur present in the reaction zone. Thus, a feedstock having too high a sulfur content to give the desired structure with the amount of alkali metal present, or added, can be diluted with a relatively low sulfur feed to give the desired results. On the other hand, where sulfur content is lower than that necessary to give the desired structure, additional sulfur can be added. Where the feedstock contains varying amounts of sulfur, the amount of sulfur can be regulated to maintain a constant quantity. This is particularly useful when adding an alkali metal to the feed, since a constant amount of the alkali metal can be added and the sulfur content controlled to give consistent, reproducible values of structure in the produced carbon black. Where varying amounts of the alkali metal are present the sulfur content can be varied to give desired structure.

While carbon black of some sort can be produced from any hydrocarbon, it has been found that the best carbon black for rubber reinforcement is one that has relatively small particle size.

To produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil; it should have a substantial aromatic content, and may be fed in vapor form if substantially vaporizable, or as an atomized spray of droplets, into the furnace. With regard to the use of petroleum oils, the following aromatic streams from an oil refinery are used commercially: (1) recycle gas oil from catalytic or thermal cracking; (2) synthetic tars from catalytic or thermal cracking; (3) cracked residues; and (4) vacuum still overhead streams and tarry residuums therefrom; or (5) aromatic streams recovered by solvent extraction of any of these streams (1) to (4).

From the standpoint of economics it is preferred to use liquid feedstocks having a U.S. Bureau of Mines correlation index (BMCI) of at least 80, preferably over 90 and more preferably over 110. The formula used is as follows:

$$BMCI = \left(\frac{867}{460+F} + \frac{6.70}{131.5+API} - 4.568\right)100$$

wherein "F" is the boiling point in ° F. at the 50 percent recovery distillation point and "API" is the American Petroleum Institute gravity at 60° F. Also from an economic standpoint the initial boiling point should be at least 170° F., preferably above 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears only to reduce the yield and not effect the quality.

The ash content should be low, generally below 0.5 weight percent, preferably below 0.2 weight percent, to keep the refractory in the carbon black furnace from fluxing, as the ash has little effect at all on the carbon black quality but tends to flux the refractory materials used in the furnaces. The viscosity is unimportant except from a mechanical standpoint of difficulties of pumping and spraying.

Of course, virgin crude oil fractions, or aromatic-selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock, we may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; an API gravity less than 20 and preferably less than 10; a viscosity low enough to permit handling, but usually above 30 SUS at 210° F.; and a low Conradson carbon residue, which however may be in excess of 1.5 weight percent, or even in excess of 3 weight percent.

As an example of one preferred distillate feedstock, we may employ a recycle gas oil derived from a cracking process and having an API gravity of 16 to 25, an initial boiling point of 400 to 600° F. and an end point of from 600 to 800° F. The carbon residue is generally low, such as 0.21 for example, although the carbon residue is not critical.

In this application and claims, unless otherwise specified, the term "potassium" and "alkali metal" are employed generically and include all forms of the potassium or alkali metal, that is, organic or inorganic compounds, in which the material is present in the reaction zone.

The amount of the alkali metal present at the time of reaction can vary within rather wide limits, depending upon the exact nature of the carbon black-forming reaction being utilized, the properties of the particular hydrocarbon stock being utilized, and the desired amount of lowering or regulation of the structure or oil absorption of the carbon black product. In all instances, the amount of alkali metal in the hydrocarbon feedstock is a small but effective amount sufficient to effect lowering or control of the structure or oil absorption of the carbon black product. Thus there will be present in the reaction zone at least 1.5, preferably 5, parts of alkali metal per million parts by weight of the feedstock. In general, the amount of alkali metal present in the feedstock is in the range of from 1.5 to 500 parts per million parts by weight of the feedstock, although higher amounts up to as much as 1500 to 2000 parts per million parts by weight of the feedstock can be present.

While not intending to limit the invention to any theory of operation, it is presently believed that the depressing effect of the alkali metal, for example potassium, on the structure of the carbon black product, is due to some modification of the carbon black-forming reaction itself, since the alkali metal must be present during the carbon black-forming reaction. Similarly, the counteracting effect of the sulfur also occurs when the sulfur is present at the time of carbon block formation in the reaction zone. Therefore, a preferred manner of utilization of sulfur is by addition to the feedstock prior to entering the reaction zone.

The invention is further illustrated by the following example:

EXAMPLE

Pure benzene was fed to a carbon black reactor made as illustrated in FIGURE 1, having a reaction section 11 that is 3 inches in diameter and 25 inches long. The tangential burners received 6.0 mcfh. of air and 0.4 mchf. of fuel gas. The axially fed stream of benzene was enveloped in a sheath of air supplied through annular space 17 at the rate of 0.2 mcfh. Runs 1 and 2 present data obtained with 0.01 weight percent KCl (52.5 parts by weight potassium per million parts of the benzene) added to the benzene feed; oil absorption values of 1.04 and 1.02, respectively, were obtained. In Runs 3 and 4, 1.5 weight percent sulfur was added as tertiary butyl disulfide to the benzene feedstock, also containing 0.01 weight percent KCl. The oil absorption values obtained were 1.20 and 1.16, respectively. Comparing these results with data obtained in control Run 5 in which neither KCl nor the sulfide were present, it is seen that 1.5 weight percent sulfur counteracted approximately one-half of the effect of an alkali metal upon the oil absorption (structure) of the carbon black product. This is a significant effect and constitutes a feasible method of controlling the structure of carbon black. Further details of the tests are presented in the following table:

Table

| Run No. | Feed rate, gals./hr. | Pre-heat, °F. | Photelometer | Yield, lb./gal. | $N_2$ surface area, m.²/g. | Oil adsorp., cc./g. | Additive, wt. percent |
|---|---|---|---|---|---|---|---|
| 1 | 8.00 | 200 | 90 | 2.65 | 130.9 | 1.04 | 0.01K |
| 2 | 7.88 | 130 | 90 | 2.80 | 131.4 | 1.02 | 0.01K |
| 3 | 7.81 | 200 | 87 | 2.62 | 126.1 | 1.20 | 0.01K / 1.5S |
| 4 | 7.34 | 125 | 87 | 2.40 | 133.4 | 1.16 | 0.01K / 1.5S |
| 5 | 7.65 | 205 | 89 | 2.60 | 124.3 | 1.37 | |

Reasonable variation and modification are possible within the scope of my invention which sets forth a process for the production of carbon black having controlled structure by controlling the sulfur present in the reaction zone, an alkali metal also being present, and novel carbon black produced thereby.

In the claims where the word "sulfur" is used, it refers to the amount of the additive calculated on the amount of the sulfur present, and does not, therefore, limit the claims to the use of a pure sulfur additive.

I claim:
1. In a process for producing carbon black from a fluid hydrocarbon feedstock containing at least 1.5 parts of an alkali metal per million parts by weight of said feedstock by subjecting said feedstock in a high temperature, carbon-forming reaction zone to the thermal dissociation temperature thereof, the improvement which comprises:
   analyzing said feedstock for sulfur content;
   producing a control signal representative of said sulfur content;
   intimately contacting said feedstock while it is being subjected to said dissociation temperature with a selected amount of sulfur in the range of 0.3 to 1.5 parts by weight of sulfur per 100 parts by weight of said feedstock; and
   controlling addition of sulfur to said feedstock responsive to said signal to maintain the sulfur in said feedstock substantially at said selected amount.

2. The improvement of claim 1 wherein said alkali metal is potassium.

3. The improvement of claim 1 wherein said sulfur is included in said feedstock prior to entry into said reaction zone.

4. In a process for producing carbon black from a fluid hydrocarbon feedstock containing at least 1.5 parts of an alkali metal per million parts by weight of said feedstock by subjecting said feedstock in a high temperature carbon-forming reaction zone to the thermal dissociation temperature thereof, the improvement which comprises:
   analyzing said feedstock for sulfur content;
   producing a control signal representative of said sulfur content;
   intimately contacting said feedstock while it is being subjected to said dissociation temperature with a selected amount of sulfur in the range of 0.3 and 1.5 parts by weight of sulfur per 100 parts by weight of said feedstock; and
   controlling addition of sulfur and addition of a low sulfur additive to said feedstock responsive to said signal to maintain the sulfur present in said reaction zone substantially at said selected amount.

5. The improvement of claim 4 wherein said alkali metal is potassium.

6. The improvement of claim 4 wherein said sulfur is added to said feedstock prior to entry into said reaction zone.

7. The process of producing carbon black which comprises:
   continuously supplying to a reaction zone a hydrocarbon reactant feedstock containing at least 1.5 parts of an alkali metal per million parts by weight of said feedstock;
   continuously introducing at a controlled rate into said reaction zone a selected amount of sulfur in the range of 0.3 and 1.5 parts by weight of sulfur per 100 parts by weight of said feedstock supplied;
   continuously analyzing said feedstock for sulfur content;
   producing a control signal representative of said sulfur content;
   continuously controlling addition of sulfur to said feedstock responsive to said signal to maintain the sulfur introduced into said reaction zone substantially at said selected amount; and
   recovering said carbon black from the reaction product.

8. The process of claim 7 wherein said alkali metal is potassium.

9. The process of claim 7 wherein said sulfur is added to said hydrocarbon feedstock prior to entry into said reaction zone.

10. In a process for producing carbon black from a fluid hydrocarbon feedstock containing at least 1.5 parts of an alkali metal per million parts by weight of said feedstock by subjecting said feedstock in a high temperature, carbon-forming reaction zone to the thermal dissociation temperature thereof, the improvement which comprises:
    analyzing said feedstock for sulfur content;
    controlling addition of sulfur and addition of a low sulfur additive to said feedstock to maintain the sulfur present in said reaction zone in the range of 0.3 to 1.5 parts by weight of sulfur per 100 parts by weight of said feedstock; and
    intimately contacting said feedstock while it is being subjected to said dissociation temperature with said sulfur.

11. The improvement of claim 10 wherein the sulfur present in said reaction zone is maintained substantially at said selected amount solely by the addition of sulfur.

12. The process of claim 10 wherein the sulfur present in said reaction zone is maintained substantially at said selected amount solely by addition of a low sulfur additive.

13. The improvement of claim 10 wherein said alkali metal is potassium.

14. The improvement of claim 11 wherein said alkali metal is potassium.

15. The improvement of claim 12 wherein said alkali metal is potassium.

References Cited by the Examiner

UNITED STATES PATENTS 3,010,794 11/1961 Frauf et al. _____ 23—209.4
3,010,795 11/1961 Frauf et al. _____ 23—209.4

FOREIGN PATENTS 507,516 6/1939 Great Britain.

MAURICE A. BRINDISI, *Primary Examiner.*